March 31, 1970 I. C. EDELL 3,503,423

FLUIDIC SIGNAL SELECTOR

Filed April 10, 1968 2 Sheets-Sheet 1

INVENTOR
IRA C. EDELL

BY Hurvitz, Rose & Greene
ATTORNEYS

INVENTOR
IRA C. EDELL

BY Hurvitz, Rose & Greene
ATTORNEYS

United States Patent Office 3,503,423
Patented Mar. 31, 1970

3,503,423

FLUIDIC SIGNAL SELECTOR

Ira C. Edell, Bowie, Md., assignor to Bowles Engineering Corporation, Silver Spring, Md., a corporation of Maryland Filed Apr. 10, 1968, Ser. No. 720,274
Int. Cl. F15c 1/12
U.S. Cl. 137—81.5 13 Claims

ABSTRACT OF THE DISCLOSURE

One or more of three or more fluid signals is selected in accordance with the pressure level of the selected signals relative to the remainder of the input signals. In one embodiment the lower pressure signal of plural variable pressure signals is passed by a respective one of plural signal transmission gates. The plural signals are arranged in pairs, each signal being paired with each of the other signals, and the pairs compared as opposing control signals in respective fluidic binary elements. The output signal from each binary element acts as in inhibit signal at the transmission gate for the input signal having the higher pressure in each compared signal pair. Output signals passed from the gates are fed to fluidic maximum pressure selectors which provide output signals corresponding to the highest pressure passed by either gate. A similar technique is employed to select the minimum pressure signal between the input signals. Where three or more input signals are present, logic circuitry is provided whereby the lowest, highest, next highest, next lowest, etc. pressure signals may be selected from the input signal group.

BACKGROUND OF THE INVENTION

The present invention relates to fluidic systems and more particularly to a pure fluid system for selecting one or more of a plurality of fluid signals on the basis of predetermined signal characteristics.

In the course of operation of various fluidic systems it is often necessary to select one or more of a group of signals on the basis of a variable parameter associated with the signals. For example, it may be a requirement that the signal of minimum amplitude be utilized in a particular circuit wherein the remaining signals are to be inhibited; or it may be required that the signal of maximum amplitude be utilized, the remaining signals being inhibited; or it may be required that one or more of the signals having intermediate amplitudes be utilized, the remaining signals being inhibited. Logic circuits for performing these selection functions are particularly useful in control systems and have applicability in both digital and analog systems.

Systems of the type described have been readily available in the electronics art for many years. However when attempting to simulate the electronic circuits with fluidic circuits, it is found that many of the techniques employed in electronics cannot be employed in fluidics. Thus, although the overall system functions may be identical, the actual components of a fluidic system can, at best, only approximate the electronic systems and in most instances require extensive modification along with the provision of completely new techniques and component inter-relationships with respect to their electronic counterparts. An example of the difficulties involved in attempting to draw fluidic-electronic analogies is the situation in which it is desired to selectively gate or inhibit selected ones of several signals. In the electrical system one merely employs a mechanical or electronic switch, which, in the latter case, may be an element which draws current or power only when in its active state. For example, a plurality of gating diodes may be so used. In fluidic systems switching is usually performed by means of a fluidic device which, under the stimulus of control signals, switches a power stream to one of two outlet passages. The power stream is normally present at all times and thus each switch consumes a specific amount of power at all times. Therefore, in order to reduce power consumption and maintain efficient fluidic system operation, it is necessary to minimize the switching functions required to achieve a predetermined result. Similarly each of the other components of fluidic systems which correspond to elements in electrical systems consume power at all times and thus the freedom that one may have in electronic systems is not available in fluidic systems.

It is an object of the present invention to provide a fluidic system in which one or more of a plurality of fluid input signals are selected on the basis of relative parameters of the signals.

It is another object of the present invention to provide a fluidic system for selecting one of a plurality of fluid signals on the basis of the relative amplitudes of said signals, the system being completely compatible with constraints placed on fluidic systems.

It is still another object of the present invention to provide a fluidic system in which the highest, lowest, or intermediate pressure signal of three input signals may be selected.

It is still another object of the present invention to present a technique applicable to permit selection of one or more of a plurality of fluid input signals on the basis of the relationship the amplitude of the selected signals bear to the amplitudes of the group of signals.

SUMMARY OF THE INVENTION

According to one embodiment of the present invention, a fluidic circuit is provided in which one or more of the highest, lowest, and intermediate pressure of three fluid input signals may be selectively utilized. The input signals are paired into three groups so that all possible pairs are considered, and the signals in each pair are compared in a binary fluidic element. The output signals at the binary element output passages indicate which signal of each compared pair has a higher pressure. The binary element output signals are utilized as input signals in fluidic logic circuitry which operates to selectively transmit or inhibit appropriate ones of the input signals for utilization. The inhibit or transmit function is accomplished in fluidic OR/NOR gates. For example, if the highest input pressure signal is to be transmitted, each input signal is fed to a respective OR/NOR gate, and the output signal from each gate is inhibited by either of two signals, the latter corresponding to the output signals from two of the binary fluidic elements. More specifically, if, upon comparison at the binary elements, a signal is found to be of lower pressure than either of the other two input signals, that signal is inhibited at its respective OR/NOR gate.

Similarly, if the comparison logic indicates that a particular signal is the lowest pressure or interemediate pressure of the three input signals, that signal is transmitted accordingly through a respective OR/NOR gate.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawing, wherein.

DESCRIPTION OF THE PREFERRED EMBODIMENT

Figure 1:
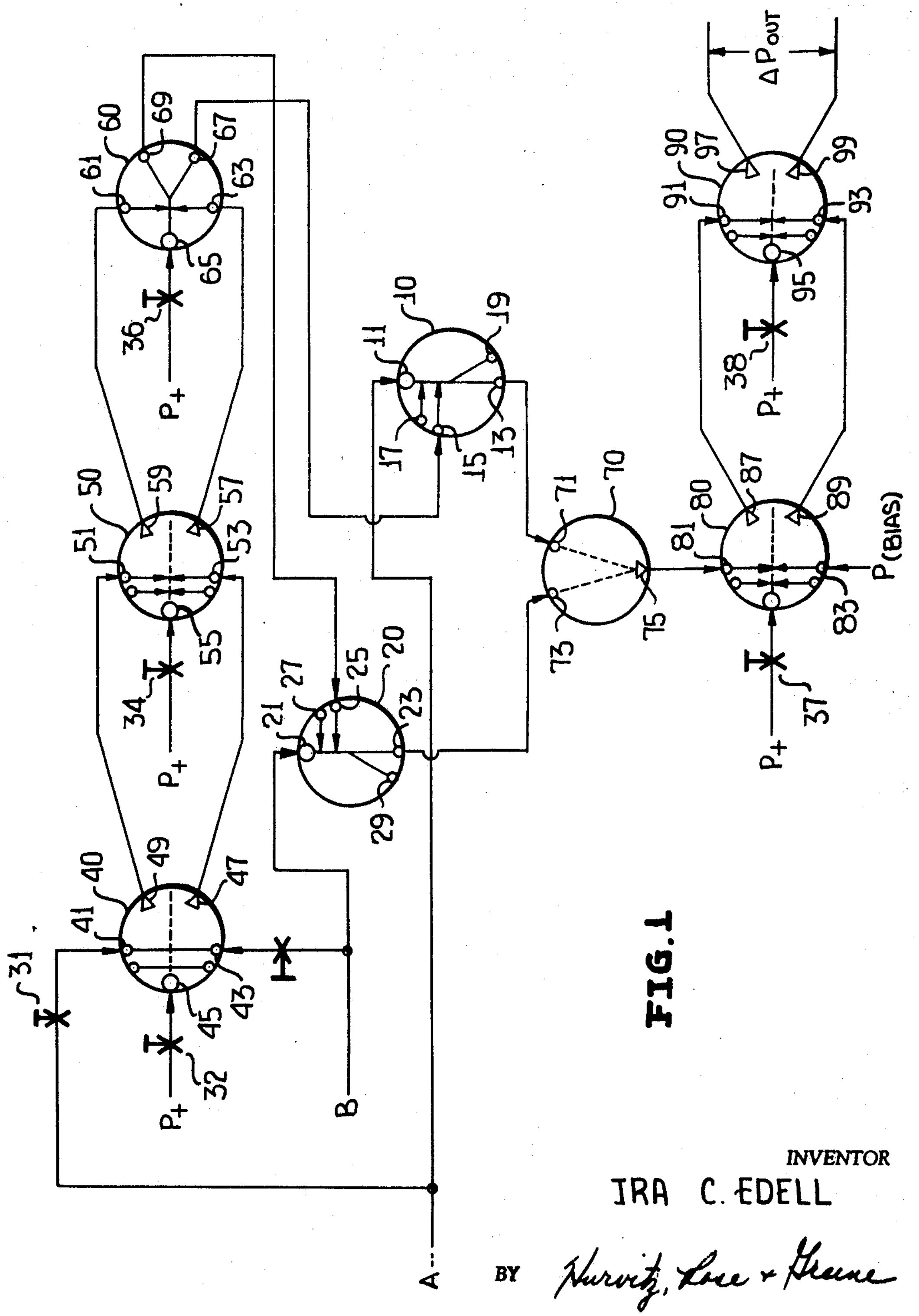
FIGURE 1 is a schematic representation of a fluidic system for selecting the minimum pressure signal of two input pressure signals.

Referring now specifically to FIGURE 1 of the accompanying drawings, there is illustrated in schematic form a minimum signal selector which receives two fluid input pressure signals A and B and which passes only whichever signal has the lower pressure. The minimum signal selector of FIGURE 1 is illustrated in order to permit a clearer understanding of the principles underlying the invention illustrated in FIGURES 2, 2*a*, 2*b*, and 2*c* below. Input signal A is connected to the power nozzle 11 of a fluidic OR/NOR gate 10 and input signal B is connected to the power nozzle 21 of a fluidic OR/NOR gate 20. OR/NOR gates 10 and 20 may be of the type illustrated in FIGURE 3 of U.S. Patent No. 3,340,885 to P. Bauer. Signal A, applied to power nozzle 11, normally issues from NOR output passage 13 in the absence of a control signal at either of control nozzles 15 or 17; the presence of a control signal at either of the control nozzles deflects signal A toward OR output passage 19. Similarly, at OR/NOR gate 20, signal B is normally issued through NOR output passage 23 in the absence of a control signal at either of control nozzles 25 or 27; the presence of a control signal at either of the control nozzles deflects signal B to OR output passage 29.

Input signals A and B are also connected via respective variable flow restrictors 31 and 33 to respective opposed control nozzles 41 and 43 of proportional pure fluid amplifier 40. Amplifier 40 may be of the type disclosed in U.S. Patent No. 3,275,013 to John R. Colston. A source of pressurized fluid P+ is connected to power nozzle 45 of amplifier 40 via a variable restrictor 32. A pair of output passages 47 and 49 are disposed symmetrically with respect to power nozzle 45 such that the power stream issued by nozzle 45 is received as a differential pressure between output passages 47 and 49 as a function of the pressure differential appearing across nozzles 41 and 43, respectively. Output passages 47 and 49 are connected to respective control nozzles 53 and 51 of pure fluid amplifier 50. Amplifier 50 is a proportional pure fluid amplifier of substantially the same type as amplifier 40. The pressurized fluid source P+ is applied to power nozzle 55 of amplifier 50 via variable restrictor 34. Output passages 57 and 59 are symmetrically disposed with respect to power nozzle 55 and receive the power stream issued thereby as a differential pressure which varies as a function of the pressure differential appearing across control nozzles 51 and 53.

Output passages 57 and 59 are connected respectively to control nozzles 63 and 61 of fluidic bistable element 60. Bistable element 60 may be of the type illustrated in FIGURE 1 of U.S. Patent No. 3,221,590 to R. W. Warren. Power nozzle 65 of element 60 is connected to pressurized fluid source P+ via a variable restrictor 36. Nozzle 65 issues a stream of fluid having two stable states in which it is directed either towards output passage 67 or output passage 69 of amplifier 60. The state of amplifier 60 may be changed by providing a sufficient pressure at the appropriate control nozzle to overcome the boundary layer attachment of the power stream to the sidewall in element 60 adjacent that control nozzle. Specifically, if the power stream in amplifier 60 is directed toward output passage 69, application of a positive pressure differential between nozzles 61 and 63 sufficient to overcome lock-on will deflect the power stream issued from power nozzle 65 toward output passages 67. Similarly, the power stream may be deflected from output passage 67 toward output passage 69 by providing a sufficiently large positive control pressure differential across control nozzles 63 and 61.

Output passage 67 is connected to control nozzle 15 of OR/NOR gate 10 and output passage 69 is connected to control nozzle 25 of OR/NOR gate 20.

NOR output passages 13 and 23 of OR/NOR gates 10 and 20, respectively, are connected to respective input passages 71 and 73 of a pure fluid maximum pressure selector element 70 such as described in copending U.S. patent application Ser. No. 386,492 by R. E. Bowles. Input nozzles 71 and 73 are disposed such that their egress orifices have center lines which intersect in the region of the ingress orifice of the output passage 75 of the maximum pressure selector 70. The distance between the ingress orifice of output passage 75 and the egress orifices of input passages 71 and 73 is such that the larger of the two pressures at input nozzles 71 and 73 dominates the smaller pressure appearing at the other input nozzle and the pressure at output passage 75 is always substantially equal to the maximum pressure appearing at either of the two input nozzles 71 and 73. To further aid the maximum pressure selection characteristic of maximum pressure selector 70, the ingress orifice of output passage 75 should be no greater than half the width of the egress orifices of input passages 71, 73; additionally the region between the input passage and output passage should have sufficient volume to maintain ambient pressure therein.

Output passage 75 of maximum pressure selector 70 is connected to control nozzle 81 of pure fluid amplifier 80, the latter being a proportional amplifier of generally the same type as amplifiers 40 and 50 described above. Control nozzle 83 of amplifier 80, which is disposed in substantial opposition to control nozzle 81, receives a bias pressure signal P(bias). Power nozzle 85 receives pressurized fluid from source P+ via a variable restrictor 37. The power stream issued by power nozzle 85 is received as a differential pressure between output passages 87 and 89 as a function of the differential pressure appearing between control nozzles 81 and 83. Output passages 87 and 89 are connected to respective substantially opposed control nozzles 91 and 93 of pure fluid amplifier 90, the latter being generally of the same type as proportional amplifiers 40, 50, and 80 described above. Power nozzle 95 of amplifier 90 receives pressurized fluid from source P+ via variable restrictor 38. The power stream issued from power nozzle 95 is received as a differential pressure appearing between output passages 97 and 99 as a function of the differential pressure across respective control nozzles 93 and 91.

Operation of the system illustrated in FIGURE 1 may be described in general terms as follows: A small portion of each of input signals A and B is sampled by means of variable restrictors or dropping orifices 31 and 33 respectively and is fed to what may be termed the sensing section of the system comprising amplifiers 40, 50, and bistable element 60. In the sensing section, the pressure differential between the sampled portions of signals A and B is amplified, first in amplifier 40 and then again in amplifier 50 with the resulting amplified pressure differential being sensed in bistable element 60, the latter assuming either of two stable states in accordance with which of signals A and B is larger at any time. Thus if $A>B$ the state of bistable element 60 will be such that the power stream thereof is received by output passage 67 whereas if $B>A$ the power stream is received by output passage 69. The output signal from the sensing section, appearing at either output passage 67 or 69 of bistable element 60, is fed to what may be termed the gating section comprising OR/NOR gates 10 and 20. When $A>B$ the resultant signal at output passage 67 is fed to control nozzle 15 of OR/NOR gate 10. Signal A appearing at power nozzle 11 is deflected by the control signal appearing at control nozzle 15 and is thus received by OR output passage 19 rather than NOR output passage 13 of gate 10. On the other hand, signal B appearing at power nozzle 21 of gate 20 is not deflected since no control signal appears at control nozzle 25 and signal B therefore appears at NOR output passage 23. Consequently, it is apparent that whichever of signals A and B has a lower pressure is passed by its respective OR/NOR gate 10 or 20 while the signal having the larger pressure is deflected to a vented OR output passage. When received at NOR output passage 23, signal B is conducted to input passage 73 of maximum pressure selector 70 and appears at the output passage 75 thereof. Signal B is then amplified in proportional amplifier stage 80 and again in proportional amplifier stage 90 so as to provide a differential pressure output signal across output passages 97 and 99 in amplifier stage 90.

Similarly, if $B>A$ a signal at output passage 69 from bistable element 60 appears at control nozzle 25 of OR/NOR gate 20 to inhibit signal B while signal A passes through OR/NOR gate 10 via NOR output passage 13 to input passage 71 of maximum pressure selector 70. Signal A is then received by output passage 75 in the maximum pressure selector and amplified by amplifiers 80 and 90 to provide a differential output signal across passages 97 and 99 of amplifier 90.

Referring to the operation of the individual elements of the system of FIGURE 1, it is important to note that amplifiers 40 and 50 are employed for a two-fold purpose. One purpose of the amplifiers is to provide high gain amplification. Specifically, it will be understood that relatively small samples of input signal A and B are to be passed to the sensing section of the system in order not to bleed off too much of these signals and thereby reduce their pressure levels at gates 10 and 20 respectively. The proportions of the input signals fed to the sensing section are adjustable by means of the variable restrictors 31 and 33. The high gain amplifier stages 40 and 50 are employed to amplify the small input samples and provide a signal at a sufficient level at bistable element 60 such that sensitive and reliable switching may be effected thereat. Thus, even though the pressure differential appearing between signals A and B appears greatly reduced in the samples derived via variable restrictors 31 and 33, respectively, this differential is greatly amplified before being applied to bistable switching element 60. A second reason for employing the amplifier stages 40 and 50 for the sampled portions of signals A and B in the sensing section of the system is to minimize the effects of hysteresis in the switching characteristic of bistable element 60. Specifically, it is desired that a very small pressure differential between control nozzle 61 and 63 effect switching of the power stream in element 60. However, a certain portion of the pressure differential appearing between nozzles 61 and 63 must be utilized to overcome the force by which the power stream is attached to the interaction region sidewall in element 60. Until this attachment force is overcome the power stream will not switch. The same problem exists in overcoming attachment to both sidewalls. Thus switching from one output passage to the other is not accomplished by the same pressure differential across the control nozzles as is required for switching of the power stream in the reverse direction. Ideally, switching should occur at respective pressure differentials as close to zero as possible; however, the range of differential pressures across the control nozzles within which switching occurs is called the hysteresis range. If the small portions of signals A and B sampled by respective variable restrictors 31 and 33 were fed directly to control nozzles 61 and 63 of element 60 rather than amplifier 40, the hysteresis range of differential pressures associated with element 60 would span a relatively large proportion of the operating range of differential pressures appearing between the low pressure samples of input signals A and B. By providing two high gain stages of amplification, the effective operating range of the sampled portions of signals A and B as viewed at control nozzles 61 and 63 of element 60 is greatly increased and hence the hysteresis region of element 60 comprises a very small and almost negligible proportion of that dynamic range.

Consequently, the hysteresis effects of element 60 are substantially minimized by amplifiers 40 and 50.

Proportional amplifiers 80 and 90 provide the system of FIGURE 1 with the capability of providing the selected one of signals A and B in amplified or attenuated form over a wide range of pressures. Specifically, by appropriately adjusting variable restrictors 37 and 38 the gains of amplifiers 80 and 90 can be adjusted accordingly. Also, the quiescent condition existing when no output signal is present at output passage 75 of the maximum pressure selector may be adjusted by means of the bias pressure connected to control nozzle 83 of amplifier 80 to provide a quiescent output pressure at substantially any desired level. In a specific embodiment, amplifiers 80 and 90 may be adjusted to provide an overall gain of one for the selected one of signals A and B. Specifically, the selected signal (A for example) experiences a pressure loss at variable restrictor 31, at power nozzle 11, at the various interconnection passages between elements, at unit 70, etc. Amplifiers 80 and 90 may be set to provide an overall gain of unity for the system and thus return the selected signal to its input level.

The purpose for utilizing maximum pressure selector 70 rather than merely connecting NOR output passages 13 and 23 together is as follows: in cases of malfunction, either of the OR/NOR gates 10 or 20 may not switch completely, in which case signals from both the gates may be received at NOR output passages 13 and 23, respectively. Where signals are received from both NOR passages, it is desirable that the signal having the maximum pressure, that is the signal which is least deflected at its OR/NOR gate, should be utilized. More particularly, the larger of signals A and B will tend to be deflected somewhat more than the smaller of the two signals at their respective OR/NOR gates. Thus the smaller of the two signals A and B will generally provide the larger pressure at the NOR output passage of its respective OR/NOR gate. The maximum pressure selector 70 utilizes this larger of the two pressures at the NOR passages to provide as an output signal at passage 75 the minimum pressure between signals A and B.

The system illustrated in FIGURE 1 may be readily converted to a maximum pressure signal selector by simply reversing the interconnections between the output passages of elements 60 and the control nozzles of OR/NOR gates 10 and 20. Specifically, if output passage 69 of binary element 60 is connected to control nozzle 15 of OR/NOR gate 10, and output passage 67 of binary element 60 is connected to control nozzle 25 of OR/NOR gate 20, the input signal having the smaller of the two pressures will be deflected at its respective OR/NOR gate 10 or 20 and the larger of the two pressure signals will pass undeflected from its respective NOR output passage.

Figure 2B:
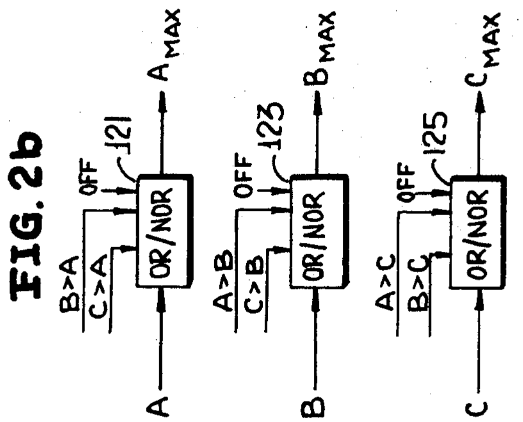
FIGURES 2, 2*a*, 2*b*, and 2*c* are schematic representations of fluidic systems for selecting the maximum, minimum, or intermediate pressure signal of three input pressure signals.

It should also be understood that the principles of operation of the system illustrated in FIGURE 1 are readily adaptable to systems for selecting one or more signals from among a plurality of input signals. An example of this may be found in FIGURES 2, 2*a*, 2*b*, and 2*c* in which three input signals A, B, and C are compared in a system which is capable of selecting either the largest pressure, smallest pressure, or intermediate pressure from amongst the three input signals. Referring specifically to FIGURE 2, there are illustrated three pure fluid flip-flops or binary elements 101, 103, and 105, each of which is substantially identical to binary element 60 described and illustrated in respect to the system of FIGURE 1. Flip-flop 101 receives signals A and B at respective opposed control nozzles; flip-flop 103 receives signals B and C at respective opposed control nozzles; flip-flop 105 receives signals C and A at respective opposed control nozzles. It is to be understood, of course, that amplifiers such as amplifiers 40 and 50 of FIGURE 1 may be utilized in conjunction with the system of FIG- URE 2 for the reasons discussed above, such amplifiers having been omitted in FIGURE 2 in order to facilitate description and understanding of the logic operations involved. One output passage of flip-flop 101 provides a fluid output signal whenever $A>B$ and the second output passage of flip-flop 101 provides a fluid output signal whenever $B>A$, the fluid output signal in either case being derived from a power stream produced from the application of pressurized fluid from source P+ to flip-flop 101. Flip-flop 103 likewise provides a fluid signal at one output passage whenever $C>B$ and a fluid signal at its second output passage whenever $B>C$. Similarly, flip-flop 105 provides a fluid signal at an output passage whenever $A>C$ and at the other output passage whenever $C>A$. FIGURE 2 illustrates the sensing section of the system in which the six basic comparison signal described above are provided. The signals are utilized in each of the gating sections illustrated in FIGURES 2*a*, 2*b*, and 2*c* which act to pass the minimum, maximum and intermediate pressure respectively of the three input signals.

Figure 2A:
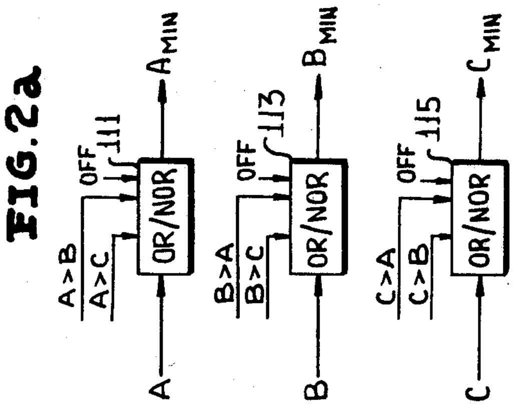
Figure 2:
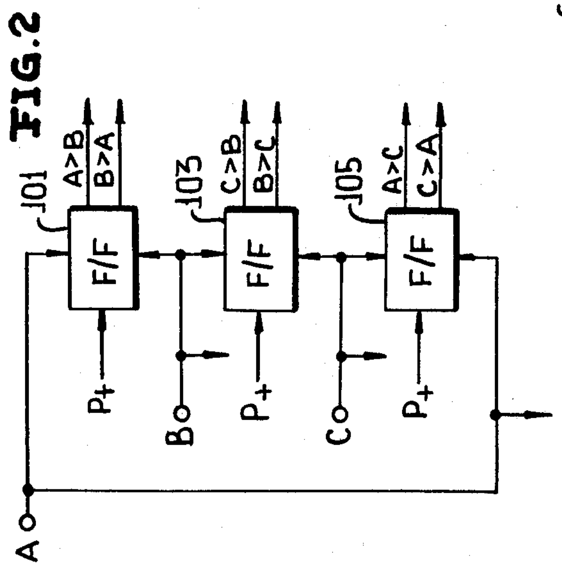

Referring now specifically to FIGURE 2*a* of the accompanying drawings there is illustrated a gating circuit for use in conjunction with the sensing circuit of FIGURE 2 by which the smallest of signals A, B, and C is passed. The circuit of FIGURE 2*a* comprises three fluidic OR/NOR gates 111, 113 and 115 of substantially the same types as OR/NOR gates 10 and 20 illustrated in FIGURE 1. Gate 111 receives signal A at its power nozzle, gate 113 receives signal B at its power nozzle and gate 115 receives signal C at its power nozzle. The two control nozzles for gate 111 receive respectively the signals $A>B$ from flip-flop 101 in FIGURE 2 and $A>C$ from flip-flop 105 in FIGURE 2. The control nozzles of OR/NOR gate 113 receive respectively the signals $B>A$ from flip-flop 101 and $B>C$ from flip-flop 103. The control nozzles for OR/NOR gate 115 receive respectively the signals $C>A$ from flip-flop 105 and $C>B$ from flip-flop 103.

The combined circuits of FIGURES 2 and 2*a* operate as follows: the lowest pressure signal of signals A, B, and C will be passed as an output signal while the other two signals will be inhibited. For example, assume that for a given set of conditions signal A has the lowest, signal B the intermediate and signal C the largest pressure of the three signals. Since signal A is the lowest of the three pressures, neither signal $A>B$ nor signal $A>C$ is present to deflect signal A or OR/NOR gate 111. Therefore, signal A passes through gate 111 undeflected to provide an output signal. At NOR gate 113, however, signal $B>A$ is present to deflect signal B and thereby inhibit its passage as a output signal from OR/NOR gate 113. Similarly, at NOR gate 115 signals $C>B$ and $C>A$ are both present, either one of which is sufficient to deflect the input signal C at OR/NOR gate 115 and thereby inhibit passage of an output signal.

It should be noted that in addition to the possibility of using undeflected output signals from NOR gates 111, 113, and 115, it is also possible to use the deflected signals as output signals. Thus the signals appearing at the OR output passages of these gates (corresponding to passages 19 and 29 in OR gates 10 and 20, respectively, in FIGURE 1) may be utilized. In this case the higher two of the three pressure signals would be passed as output signals and the lower pressure signal would be inhibited.

Referring now specifically to FIGURE 2*b*, there is illustrated in schematic form a circuit for passing the maximum of three input signals when used in conjunction with the selector circuit of FIGURE 2. Specifically, three OR/NOR gates 121, 123, and 125 are provided which are substantially the same as OR/NOR gates 10 and 20 of the system illustrated and described in FIGURE 1. Gate 121 receives signal A at its power nozzle, gate 123 receives signal B at its power nozzle, and gate 125 receives signal C at its power nozzle. The two control nozzles for gate 121 receive respectively signal $B>A$ from flip-flop 101 and signal $C>A$ from flip-flop 105. OR/NOR gate 123 receives as its two controls signals $A>B$ from flip-flop 101 and $C>B$ from flip-flop 103. OR/NOR gate 125 receives as its two control signals $A>C$ from flip-flop 105 and $B>C$ from flip-flop 103.

In operation the circuit of FIGURE 2*b* in conjunction with the circuit of FIGURE 2 acts to select the maximum of the three pressures of signals A, B and C. For example, suppose that signal A is the smallest, and signal B is intermediate and signal C is the maximum of the three input signals for any given set of conditions. Since signal A is the smallest, both signals $B>A$ and $C>A$ will appear as control signals at gate 121 to deflect signal A and inhibit its passage as an output signal. At gate 123 signal $C>B$ is present to deflect signal B and inhibit its passage as an output signal. However, at gate 125 neither of signals $A>C$ or $B>C$ is present since C is greater than both A and B. Thus signal C passes through NOR gate 125 to provide the output signal for the circuit.

As described above regarding the circuit of FIGURE 2*a*, the OR output passages of the OR/NOR gates 121, 123 and 125 may be utilized as output passages rather than the NOR output passages whereby the two lower pressure signals rather than the one higher pressure signal of the three input signals A, B and C can be selected.

Figure 2C:
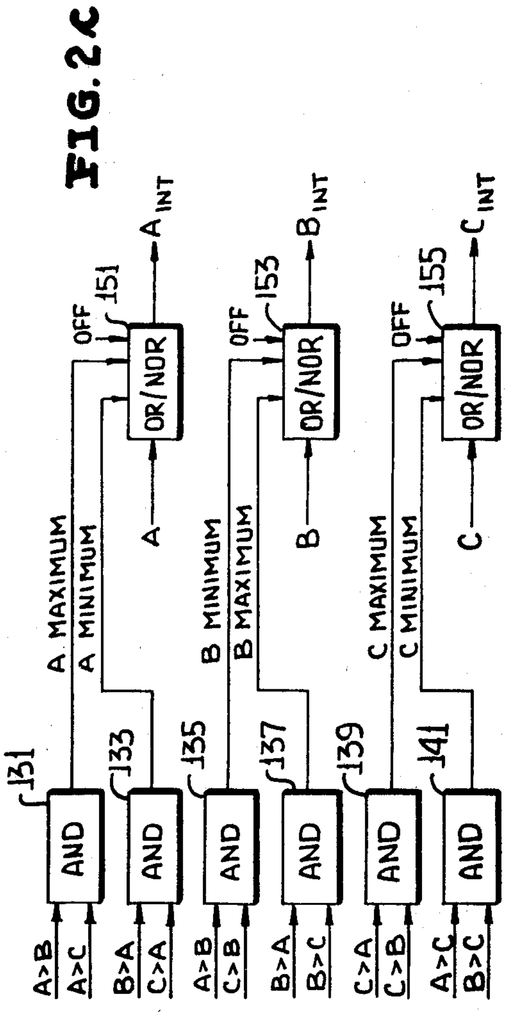

Referring now to FIGURE 2*c*, there is illustrated a circuit which when used in conjunction with the circuit of FIGURE 2 provides as an output signal the one of signals A, B and C which has the intermediate pressure. The circuit comprises six pure fluid AND gates 131, 133, 135, 137, 139 and 141 respectively and three pure fluid OR/NOR gates 151, 153 and 155, respectively. The pure fluid AND gates may be of the type described in U.S. Patent No. 3,277,915 to R. J. Dockery. The OR/NOR gates 151, 153 and 155 are substantially the same as OR/NOR gates 10 and 20 illustrated and described above with reference to FIGURE 1. Each of the AND gates receives two fluid input signals and provides an output signal only when both input signals are present. AND gate 131 receives signals $A>B$ from flip-flop 101 and $A>C$ from flip-flop 105 Therefore, an output signal is present from AND gate 131 whenever signal A has the highest pressure of the three input signals A, B and C. AND gate 133 receives as its input signals $B>A$ from flip-flop 101 and $C>A$ from flop-flop 105; therefore AND gate 133 provides an output signal whenever A is the smallest of the three input signals A, B and C. The two output signals from AND gates 131 and 133, respectively are applied as control signals to respective control nozzles of OR/NOR gate 151 so that whenever A is the highest or lowest of signals A, B and C its passage through gate 151 is inhibited by a control signal.

AND gate 135 receives as its input signals signal $A>B$ from flip-flop 101 and signal $C>B$ from flip-flop 103; therefore the output signal from AND gate 135 is present whenever B is smaller than both A and C. AND gate 137 receives as its input signals $B>A$ from flip-flop 101 and signal $B>C$ from flip-flop 103; therefore the output signal from AND gate 137 is present whenever signal B is greater than both signals A and C. The output signals from both AND gates 135 and 137 are connected as control signals to respective control nozzles at OR/NOR gate 153 which also receives at its power nozzle signal B. Thus whenever signal B is greater than or smaller than both signals A and C its passage through gate 153 is inhibited.

AND gate 139 receives as its input signals $C>A$ from flip-flop 105 and $C>B$ from flip-flop 103; therefore an output signal from AND gate 139 represents the situation where signal C is greater than both signals A and B. AND gate 141 receives as its input signals $A>C$ from flip-flop 105 and $B>C$ from flip-flop 103; thus the output signal from AND gate 141 represents the condition where signal C is less than both signals A and B. The output signals from AND gates 139 and 141 are fed as control signals to respective control nozzles of NOR gate 155 which also receives at its power nozzle signal C. Thus when signal C is greater than or less than both signals A and B its passage through NOR gate 155 is inhibited.

As an example of the operation of the circuit of FIGURE 2*c* in conjunction with that in FIGURE 2 assume that the pressures of signals A, B, and C are of respectively increasing values. Under such conditions AND gate 131 provides no output signal since A is of lower pressure than both signals B and C. AND gate 133 provides an output signal because both signals B and C are greater than signal A, the output signal from AND gate 133 being applied as a control signal to OR/NOR gate 151 to inhibit passage of signal A through that gate. AND gate 135 produces no output signal since one of its input signals, namely signal $A>B$, is not present. Similarly, AND gate 137 produces no output signal because one of its input signals, namely signal $B>C$, is not present. Thus there is no control signal applied to OR/NOR gate 153 and signal B passes therethrough as an output signal. AND gate 139 provides an output signal because both of its input signals, namely signal $C>A$ and signal $C>B$ are present. AND gate 141 does not produce an output signal since neither of its input signals are present. However the output signal from AND gate 139 is sufficient to deflect signal C at OR/NOR gate 155 to inhibit its passage therethrough. From the above description it is seen that for the hypothesized conditions only signal B is passed as an output signal in FIGURE 2*c*, the signals A and C being inhibited at their respective NOR gates 151 and 155. Similarly, when either of signals A or C is the intermediate pressure signals, that signal is passed as the output signal of the circuit.

As described above with reference to FIGURES 2*a* and 2*b*, it is possible to employ the OR output passages rather than the NOR output passages in gates 151, 153 and 155 so as to reduce as output signals the lower and higher pressure signals respectively and inhibiting the intermediate pressure signal.

It is to be understood in conjunction with the circuits of FIGURES 2*a*, 2*b* and 2*c*, that the maximum pressure selector 70 of FIGURE 1 may be employed between any pair of OR/NOR gate output passages. Specifically, if it is desired to employ the maximum pressure selector in FIGURE 2*a*, output signals A and B from gates 111 and 113 may be connected as input signals to a maximum pressure selector, the output of which may be fed as an input signal to a further maximum pressure selector receiving as its second input signal output signal C from gate 115. The same arrangement may be utilized in conjunction with the circuits of FIGURES 2*b* and 2*c*. Similarly, it is to be understood that the amplifiers corresponding to amplifiers 80 and 90 in FIGURE 1 may be utilized as desired and to provide desired gain functions for the output signals of each of the circuits in FIGURES 2*a*, 2*b* and 2*c*.

It is also to be understood that by proper extension of the principles described above it is possible to select one or more signals from a group of any number of input signals on the basis of the relationship which the selected signal or signals bear to the overall group of signals. Naturally certain modifications in the logical operations must be employed in accordance with the number of input signals utilized and in accordance with the characteristic relationship by which the selected signal or signals are to be chosen (that is, in accordance with whether the selected signal has the highest pressure, lowest pressure, intermediate pressure, two highest pressures, four highest pressures, etc.). As a general rule however it should be apparent that the number of binary elements N required for a system having $n$ input signals is determined from the following expression:

$$N=\frac{n(n-1)}{2}$$

Thus for a system having four input signals, six binary elements are required in order that all of the signals may be compared to one another. Similarly, a system having five input signals requires ten binary elements to achieve complete comparison.

In addition, it is to be understood that the circuits illustrated in FIGURES 2*a*, 2*b*, and 2*c* may be utilized individually with the circuit of FIGURE 2, or in the alternative may be connected together in one large circuit in which a maximum, minimum, or intermediate pressure function may be selectively utilized. For this mode of operation, an "OFF" signal may be selectively applied to a further control nozzle of each of OR/NOR gates 111, 113, 115, 121, 123, 125, 151, 153 and 155. If any gate receives an "OFF" signal it is disabled and incapable of transmitting its respective input signal. Thus, if it is desired to utilize only the minimum input pressure signal, gates 121, 123, 125, 151, 153, and 155 would be disabled; if it is desired to utilize both the intermediate pressure input signal and the minimum pressure input signal, only gates 121, 123, and 125 would be disabled, etc.

It will be appreciated by those familiar with digital logic techniques that the various AND functions performed by elements 131, 133, 135, 137, 139 and 141 of FIGURE 2*c* may be achieved by utilizing NOR logic exclusively. More specifically, it is recognized that the AND function $X \cdot Y$ of two binary signals X and Y may be achieved as follows:

(1) Invert X to obtain $\overline{X}$.
(2) Invert Y to obtain $\overline{Y}$.
(3) Obtain NOR function of $\overline{X}$ and $\overline{Y}$ to obtain $$\overline{\overline{X}+\overline{Y}}=X \cdot Y$$

Each of operations (1), (2) and (3) above may be achieved by utilizing respective fluidic OR/NOR gates of a type such as gate 10 of FIGURE 1. The advantages of utilizing fluidic NOR logic exclusively include uniformity of elements throughout the system, inherent signal amplification without resort to additional amplifier elements, and concomitant increased fanout capability for each element.

While I have described and illustrated plural specific embodiments of my invention, it will be clear that variations of the details of construction which are specifically illustrated and described may be resorted to without departing from the spirit and scope of the invention as defined in the appended claims.

I claim:

1. A fluidic system for selecting at least one of three or more fluid input signals, said at least one fluid input signal having a predetermined characteristic relative to the others of said plurality of fluid input signals, said system comprising:

fluidic logic means for comparing said plurality of fluid input signals for providing control signals as a function of which of said input signals has said predetermined characteristic;

fluidic gating means responsive to said control signals for passing only whichever of said input signals have said predetermined characteristic.

2. The system according to claim 1 wherein the predetermined characteristic characterizing said at least one signal is that its pressure is lower than the pressure of the remainder of said plurality of fluid input signals.

3. The combination according to claim 2 wherein said fluidic gating means comprises:

a plurality of fluidic gates, one each for each of said plurality of fluid input signals, each gate having a power nozzle for issuing a power stream in response to pressurized fluid applied thereto, an output passage disposed to receive said power stream when undeflected, and a pair of control nozzles for issuing respective control streams to deflect said power stream away from said output passage in response to respective control signals applied to said control nozzles;

means for applying each of said fluid input signals to the power nozzle of respective ones of said fluidic gates; and means for applying the control signals produced by said fluidic logic means to respective control nozzles of respective ones of said fluidic gates in order that only the lowest pressure input signal is issued undeflected from said plurality of fluidic gates.

4. The system according to claim 1 wherein said predetermined characteristic is that said at least one signal has a higher pressure than the remainder of said plurality of inputs signals.

5. The system according to claim 1 wherein said predetermined characteristic is that said at least one signal has a pressure intermediate the highest and lowest pressures of said plurality of input signal.

6. The system according to claim 1 wherein said gating means comprises a plurality of fluidic NOR gates, one each for each of said plurality of fluid input signals, each gate having input means for receiving a respective one of said fluid input signals, output means for normally providing an output signal in response application of an input signal to said input means, and control means for receiving a predetermined pair of said control signals and responsive to application of at least one of said control signals thereto for inhibiting said output signal at said output means.

7. The combination according to claim 6 wherein said fluidic logic means comprises:

$$\frac{n(n-1)}{2}$$

fluidic bniary elements, where $n$ is equal to the number of fluid input signals applied to said system, each fluidic binary element having two stable states, a pair of output passages each for providing one of said fluid control signals in response to a respective stable state of said element, and input means responsive to a pair of fluid signals applied thereto for selectively changing the state of said element in accordance with which of said pair of fluid signals has the higher pressure;

means for arranging each of the $n$ fluid input signals in $$\frac{n(n-1)}{2}$$

pairs such that each input signal is paired with every other input signal and for applying each of said pairs to the input means of a respective one of said fluidic binary elements;

means for connecting each output passage of said fluidic binary elements to a respective control means of said plurality of fluidic NOR gates such that the input signal having the highest pressure is passed through the output means of the fluidic NOR gate to which it is applied and the other input signals are inhibited at the respective fluidic NOR gates to which they are applied.

8. The combination according to claim 6 wherein said fluidic logic means comprises:

$$\frac{n(n-1)}{2}$$

fluidic binary elements, where n is equal to the number of fluid input signals, applied to said system each fluidic binary element having two stable states, a pair of output passages each for providing one of said fluid so that each receives said pressurized stream for control signals in response to a respective stable state of said element, and input means responsive to a pair of fluid signals applied thereto for selectively changing the state of said element in accordance with which of said pair of fluid signals has a higher pressure;

means for arranging each of the $n$ fluid input signals in $$\frac{n(n-1)}{2}$$

pairs such that each input signal is paired with every other input signal and for applying each of said pairs of input signals to the input means of a respective one of said fluidic binary elements;

means for connecting each output passage of said plurality of fluidic NOR gates such that the input signal having the lowest pressure is passed undeflected through the output means of the fluidic gate to which it is applied and the other input signals are deflected away from said output passages of the respective fluidic gates to which they are applied.

9. The combination according to claim 6 wherein said fluidic logic means comprises:

$$\frac{n(n-1)}{2}$$

fluidic binary elements, where $n$ is equal to the number of fluid input signals applied to the system, each of said fluidic binary elements having two stable states, a pair of output passages, each for providing one of said control signals in response to a respective stable state of said element, and input means responsive to a pair of fluid signals applied thereto for selectively changing the state of said element in accordance with which of said pair of fluid signals has a higher pressure;

means for arranging each of the $n$ fluid input signals in $$\frac{n(n-1)}{2}$$

pairs such that each input signal is paired with every other input signal and for applying each of said pairs of the input means of a respective one of said fluidic binary elements;

fluidic AND gate means responsive to signals in preselected pairs of said output passages of said binary elements for applying control signals to the control means of respective ones of said fluidic gates such that only those input signals bearing a predetermined relationship to all of the $n$ input signals are based uninhibited through said output passages of the respective fluidic NOR gates to which they are applied.

10. The combination according to claim 9 wherein said predetermined relationship is characterized by the fact that the signal passed by the respective fluidic gate to which it is applied has a pressure intermediate the pressures of the other input signals applied to the system.

11. The combination according to claim 1 wherein said predetermined characteristic is characterized by the fact that said at least one signal has the highest pressure of all of said input signals.

12. The combination according to claim 1 further comprising means for amplifying all signals passed by said fluidic gating means.

13. The combination according to claim 1 further comprising the means for amplifying said fluid input signals before they are applied to said fluidic logic means.

References Cited

UNITED STATES PATENTS

| | | | |
|---|---|---|---|
| 3,380,655 | 4/1968 | Swartz | 137—81.5 XR |
| 3,410,289 | 11/1968 | Dexter | 137—81.5 |
| 3,411,520 | 11/1968 | Bowles | 137—81.5 |
| 3,437,100 | 4/1969 | Rona | 137—81.5 |
| 3,451,410 | 6/1969 | Boothe | 137—81.5 |
| 3,452,665 | 7/1969 | Furlong | 137—81.5 XR |

SAMUEL SCOTT, Primary Examiner

U.S. Cl. X.R.

235—201